United States Statutory Invention Registration [19]

[11] Reg. Number: H897

Wiencek et al. [43] Published: Mar. 5, 1991

[54] BORON-COPPER NEUTRON ABSORBING MATERIAL AND METHOD OF PREPARATION

[75] Inventors: Thomas C. Wiencek, Bolingbrook; Robert F. Domagala, Indian Head Park; Henry Thresh, Palos Hts., all of Ill.

[73] Assignee: The United States of America as represented by the United States Department of Energy, Washington, D.C.

[21] Appl. No.: 406,006

[22] Filed: Sep. 12, 1989

[51] Int. Cl.[5] ..... G21C 11/00

[52] U.S. Cl. ..... 250/518.1; 250/515.1; 252/478

*Primary Examiner*—John S. Maples
*Assistant Examiner*—Joseph D. Anthony
*Attorney, Agent, or Firm*—Hugh W. Glenn; Robert J. Fisher; William R. Moser

[57] ABSTRACT

A composite, copper clad neutron absorbing material is comprised of copper powder and boron powder enriched with boron 10. The boron 10 content can reach over 30 percent by volume, permitting a very high level of neutron absorption. The copper clad product is also capable of being reduced to a thickness of 0.05 to 0.06 inches and curved to a radius of 2 to 3 inches, and can resist temperatures of 900° C. A method of preparing the material includes the steps of compacting a boron-copper powder mixture and placing it in a copper cladding, restraining the clad assembly in a steel frame while it is hot rolled at 900° C. with cross rolling, and removing the steel frame and further rolling the clad assembly at 650° C. An additional sheet of copper can be soldered onto the clad assembly so that the finished sheet can be cold formed into curved shapes.

14 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BORON-COPPER NEUTRON ABSORBING MATERIAL AND METHOD OF PREPARATION

CONTRACTUAL ORIGIN OF THE INVENTION

This invention was developed under contract no. W-31-109-ENG-38 between the University of Chicago and the U.S. Department of Energy.

BACKGROUND OF THE INVENTION

This invention relates to a composite neutron absorbing material made of copper and enriched boron, and a method of preparing the material with powdered metallurgy techniques.

Neutron absorbing materials are necessary where neutron regulation and management within a neutron producing structure and its surrounding containment are required. Neutron studies at the Argonne National Laboratory are carried out at the Intense Pulsed Neutron Source (IPNS). An accelerator is used to produce a beam of protons for interaction with a uranium target. A spallation reaction is induced in the uranium to produce a neutron spectrum for the physical studies of matter. In order to increase the neutron yield threefold, the depleted uranium target containing small percentages of $^{235}U$ has been upgraded by using a target that contains up to 77.5% wt. % $^{235}U$. The neutron yield from the spallation reaction is augmented by fissioning of the target $^{235}U$. This approach requires control of the thermal portion of the neutron spectrum to keep $k_{eff}$ (fissions per generation $_{n+1}$/fissions per generation $_n$) $<0.85$. Thus an effective thermal neutron absorber is required to be located in a limited space in close proximity to the uranium target. The thermal energy developed in the target by proton interaction is removed by water cooling. Safety considerations call for the target assembly to withstand temperatures up to 900° C. if accident conditions are sustained by a loss of coolant.

Previous technology used shielding materials including cadmium and Boral (boron carbides in an aluminum matrix). With the upgraded IPNS, however, a new shielding material was required that could sustain increased neutron loadings, heat approaching 900° C., and yet still be formable to small radii (less than 3 inches). Neither cadmium, boral, nor other materials such as boron carbide ($B_4C$) would meet these criteria.

Conventional teaching, such as that in U.S. Pat. No. 3,000,802 to Worn et al., has been that high concentrations of boron cause severe embrittlement of alloys. Thus, a higher boron concentration results in poor ductility, and consequent problems in bending and shaping the metal. Cadmium borate, as suggested in U.S. Pat. No. 2,859,163, is equally unsuitable. It is therefore desirable to develop a material that has an increased capacity for neutron absorption, structural integrity in the face of high temperatures that could melt or damage prior art materials, and ductility that allows for the manufacture of thin, roundly formed shapes.

SUMMARY OF THE INVENTION

The present invention, which is a copper clad, composite mixture of powdered copper and enriched boron, solves these problems. The material can attain very high loadings of boron 10 ($^{10}B$) atoms, reaching surface loadings in excess of $0.5\times10^{22}$ atoms of $^{10}B/cm^2$ in sections as thin as 0.067 inches with cladding as thin as 0.010 inches. The material is stable and can withstand sustained temperatures of 900° C. The sheet composite material has been formed into curved shapes with radii as small as 2.1 inches.

The present invention is a composite neutron absorbing material employing $10_B$ as the decoupling agent. It is comprised of a particulate mixture of boron powder and copper powder in which the volume of boron is in the range of 10 to 50 percent and the volume of copper is in the range of 90 to 50 percent. Preferably the boron includes between 20 and 90 percent by weight of boron 10. Most preferably, at least 25 weight percent boron 10 is selected. The boron-copper mixture is preferably substantially surrounded by a copper cladding.

The material is prepared using powder metallurgy techniques. The copper and boron powders are sieved, weighed, mixed, and then cold pressed. The resulting green compact formed by the pressing is then degassed. Copper plate used for the cladding is cut, rolled to size, and machined to form cavities for receiving the green compacts. The compacts are sealed and welded inside the copper plates. The copper clad material is placed in a restraining steel support assembly and then hot rolled at approximately 900° C. When the steel support is removed the material is rolled a second time at approximately 650° C., thus producing sheets of the clad material for fabrication use. Fabrication, especially into round or curved shapes, is facilitated by a copper backup plate that is soldered to the material prior to three roll bending (forming) into the final shapes.

DESCRIPTION OF THE PREFERRED EMBODIMENTS

The new material is made necessary by the dimensional constraints of the IPNS at Argonne National Laboratory. Only very thin layers of neutron shielding material can be fit into locations such as the proton beam tube liner, the decoupler assembly, bore tube and pressure housing in the vicinity of the uranium target, and the back disc by the Incocel spring. With the target approaching an 80 percent content of $^{235}U$, it was determined that safety and performance requirements dictated a material that was not currently available. It was necessary to maintain $k_{eff}$ at a safe level and protect against possible temperature excursions approaching 900° C. Current materials such as $B_4C$, with typical $^{10}B$ loadings of $0.1\times10^{22}$ atoms/cm$^2$ in 0.067 inch sections, are simply inadequate as absorbers. Nor would the mechanical properties permit the formation of cylindrically rolled sections in small radii.

An understanding of the present invention can be developed from a discussion of the manufacturing and testing processes. Typically enriched boron powder, −100 mesh, is received, washed with methanol several times, and vacuum dried to remove contaminations of $B_2O_3$. Typical analyses of three amorphous boron powder samples are shown in the attached table.

| | As-Received $^{10}B$ Powder (wt. %) | As-Washed, #1 $^{10}B$ Powder (wt. %) | As-Washed, #2 $^{10}B$ Powder (wt. %) |
|---|---|---|---|
| $B^{10}$* | 89.77 ± 0.05 | 90.29 ± .05 | 90.29 ± 0.05 |
| $B^{11}$* | 10.23 ± 0.05 | 9.71 ± .05 | 9.71 ± 0.05 |
| Total B** | 85.3 ± 0.25 | 89.7 ± 0.08 | 89.25 ± 0.25 |

**The balance of the powder is 1-10% Si, 1.6% Total Al, Ca, Cr, Cu, Fe, K, Mg, Mn, Na, Ni, Pb

*Values given are wt. % of total Boron.

Electronic grade copper powder such as Alcan 185E was used to form the B-Cu particulate mixture.

The B-Cu mixture (40 v/o $^{10}B$) was cold pressed at 84,000 psi to form green compacts that were then vacuum annealed, or degassed, at 800° C. for 3 hours. This technique forms what is known as the "meat" of the material. Copper cladding is used to contain the meat because it is not reactive with the boron. The cladding, preferably oxygen-free, high conductivity (OFHC) copper, is etched to receive the meat compacts and then the cladding is electron beam welded. A typical sheet before rolling may be approximately $\frac{3}{4}$ to 1 inch thick, with the compacts on the order of 0.4 to 0.5 inches.

Prior to rolling, the cold material is placed in a steel restraining or support frame. It is necessary to restrain the copper so it cannot flow in all directions, which in turn would cause cracks in the much less malleable boron and copper mixture. The frame permits uniform deformation, so that rolling sinters and densifies the material. The frame also limits oxidation of the copper at high rolling temperatures. Once in the frame, the material is hot rolled in one direction at a first temperature of approximately 900° C. It is also a preferred part of the method to roll the material at 90° angles to the initial rolling. It is believed that this creates a more uniform product. The hot rolling typically reduces the thickness of the material by approximately 40 to 60 percent.

After the hot rolling the steel frame is removed and the clad material is rolled again at a second temperature of approximately 650° C. This reduces the thickness by an additional 70 percent and strengthens the copper matrix. The rolling process ultimately results in a composite plate material with the meat approximately 0.05 to 0.06 inches thick and each sheet of cladding on the order of 0.010 to 0.015 inches thick.

The two-stage rolling together with cross rolling provides good bonding of the copper cladding to the copper particles in the matrix containing the powdered boron. In another preferred step of the procedure, the interface between the steel frame and the copper cladding is given an yttrium oxide coating by means of an yttrium oxide and ethanol wash prior to assembling the steel frame. This prevents the protective frame from sticking to the copper cladding.

The resulting neutron shielding material can be cut by mechanical means, usually a diamond tipped blade. It can then be roll formed into cylindrical or half cylindrical shapes, bored or otherwise pierced to accept fasteners, and welded or otherwise attached at the edges to form overlapping seams. The roll forming is performed by first attaching a sheet of copper back-up plate on the outside of the radius of curvature. Thus, when roll forming is performed, the back-up plate is placed in tension while the clad composite material is placed primarily in compression.

Temperature testing of the composite material proved successful and demonstrated the high temperatures that can be sustained. A 2 in. ×2 in. piece of 0.074 thick B-Cu composite (0.05 in. meat, 2×0.012 in. clad) was tested in air for 7 hours at 895 ±5° C. A similar piece of solid OHFC copper was also included as a control. The results of the test are tabulated below:

| | Width* (in.) | Length (in.) | Thickness (in.) | Weight (g) |
|---|---|---|---|---|
| Cu Sheet | | | | |

-continued

| | Width* (in.) | Length (in.) | Thickness (in.) | Weight (g) |
|---|---|---|---|---|
| As Fabricated | 2.037 | 2.041 | 0.072 | 40.154 |
| After Testing | 2.036 | 2.038 | 0.053 | 30.147 |
| Differ. | −0.001 | −0.003 | −0.019 | −10.007 |
| Cu—$^{10}B$ Sheet | | | | |
| As Fabricated | 2.016 | 2.034 | 0.074 | 28.341 |
| After Testing | 2.028 | 2.043 | 0.060 | 20.257 |
| Differ. | +0.012 | +0.009 | −0.014 | −8.084 |

*The length is defined arbitrarily as the dimension in the initial rolling direction and the width is at 90° to the rolling direction.

Although the present invention is envisioned for use in the IPNS, other uses are equally feasible, in particular when small dimensions are a problem or when safety constraints for temperature level and neutron absorption are important.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. A neutron absorbing material comprised of a boron copper particulate mixture wherein the volume of boron in said material is in the range of 10 to 50 percent and the volume of copper is in the range of 50 to 90 percent.

2. The material of claim 1 wherein said boron includes 20 to 90 percent by weight of boron 10.

3. The material of claim 2 wherein said material is at least 25 weight percent boron 10.

4. The material of claim 1 further comprising copper cladding substantially surrounding said material.

5. The material of claim 1 wherein 0.5 to $1.0\times10^{22}$ atoms/cm$^2$ of boron 10 are loaded into thicknesses of said material on the order of 0.065 to 0.080 inches thick.

6. The material of claim 5 wherein said boron and said copper are powders in the range of minus 100 U.S. Mesh Series.

7. A method of preparing a copper-boron neutron absorbing material, comprising the steps of:

sieving, weighing, and mixing copper and boron powders;

cold pressing said powders into green compacts;

degassing said green compacts;

cutting and rolling copper plate;

machining cavities in said plate to receive said compacts;

welding said plates together to seal said compacts in said cavities to form a clad assembly;

hot rolling said clad assembly at a first temperature to reduce the thickness of said assembly; and subsequently rolling said clad assembly at a second temperature to further reduce the thickness of said assembly.

8. The method of claim 7 further comprising the steps of placing said clad assembly in a restraining structure prior to said hot rolling and removing said structure after said hot rolling at said first temperature.

9. The method of claim 7 wherein said hot rolling is performed at a first temperature of approximately 900° C.

10. The method of claim 9 wherein said subsequent rolling is performed at a second temperature of about 650° C.

11. The method of claim 10 further comprising the steps of cross-rolling said clad assemblies during said steps of hot rolling and subsequent rolling.

12. The method of claim 11 further comprising the step of soldering a copper back-up plate to said clad assembly after said hot and subsequent rolling to facilitate the fabrication of the material into curved or rounded shapes.

13. The method of claim 7 further comprising the step of washing said boron powder with methanol prior to said mixing with said copper powder.

14. The method of claim 7 wherein said boron powder is enriched with 70 to 90 percent boron 10.

* * * * *